United States Patent
Newlin et al.

(10) Patent No.: US 9,164,922 B2
(45) Date of Patent: Oct. 20, 2015

(54) TECHNIQUE FOR PASSIVE CACHE COMPACTION USING A LEAST RECENTLY USED CACHE ALGORITHM

(75) Inventors: John Newlin, Belmont, CA (US); Jeffrey Adgate Dean, Palo Alto, CA (US)

(73) Assignee: Google Inc., Mountain View, CA (US)

(*) Notice: Subject to any disclaimer, the term of this patent is extended or adjusted under 35 U.S.C. 154(b) by 681 days.

(21) Appl. No.: 13/546,452

(22) Filed: Jul. 11, 2012

(65) Prior Publication Data

US 2015/0169470 A1   Jun. 18, 2015

Related U.S. Application Data

(60) Provisional application No. 61/655,943, filed on Jun. 5, 2012.

(51) Int. Cl.
*G06F 12/12* (2006.01)
*H04L 29/06* (2006.01)
*H04L 29/08* (2006.01)

(52) U.S. Cl.
CPC .......... *G06F 12/122* (2013.01); *H04L 67/2842* (2013.01); *H04L 67/42* (2013.01); *G06F 2212/69* (2013.01)

(58) Field of Classification Search
CPC . G06F 12/0848; G06F 2212/69; G06F 12/12; H04L 67/42; H04L 67/2842
See application file for complete search history.

(56) References Cited

U.S. PATENT DOCUMENTS 5,717,893 A * 2/1998 Mattson ........................ 711/129
7,797,275 B2   9/2010 Lee et al.

* cited by examiner

*Primary Examiner* — Kalpit Parikh
(74) *Attorney, Agent, or Firm* — Dority & Manning, P.A.

(57) ABSTRACT

An example method for passive compaction of a cache includes determining first metadata associated with first data and second metadata associated with second data. The first metadata includes a first retrieval time, and the second metadata includes a second retrieval time. The example method further includes obtaining a first metadata key including a first unique identifier and obtaining a second metadata key including a second unique identifier. The example method also includes generating a first data key and generating a second data key. The example method further includes writing, at a client device, the first and second data to the cache. Each of the first and second data occupy one or more contiguous blocks of physical memory in the cache, and the first and second data are stored in the cache in an order based on the relative values of the first and second retrieval times.

21 Claims, 11 Drawing Sheets

TECHNIQUE FOR PASSIVE CACHE COMPACTION USING A LEAST RECENTLY USED CACHE ALGORITHM

CROSS REFERENCE TO RELATED APPLICATION

This application claims the benefit of U.S. Provisional Application No. 61/655,943 (SKGF Ref. No. 2525.9620000), filed Jun. 5, 2012, titled "Technique for Passive Cache Compaction Using a Least Recently Used Cache Algorithm," which is incorporated herein by reference in its entirety.

BACKGROUND

1. Field

This disclosure generally relates to caching data and in particular to writing data received over a network to a cache.

2. Background

A client application may request data over a network and write the data to a local cache. In an example, the client application may stream data over a high-speed network connection and display the data to a user. Writing data to a cache may enable the client application to quickly retrieve the data from the local cache rather than download the data again over the network. Further, the user may access and use the client application even when the high-speed network connection is unavailable or impractical because the client application may retrieve the data from the cache rather than over the network.

The data may be inserted into the cache, and the older data in the cache may be removed after a maximum amount of data has been stored in the cache to make room for new data. Deleting the old data may leave holes in the cache, and it may be desirable to compact the cache. Cache compaction, however, may be time consuming and cause glitches in the application. For example, the application may not have access to the cache while it is being compacted. Accordingly, the user may experience a time delay when waiting for the application to respond. This may degrade the user's experience.

BRIEF SUMMARY

Embodiments relate to passive compaction of a cache. An example method for passive compaction of a cache includes retrieving a plurality of data units via a network interface. The example method also includes determining a retrieval time associated with each of the plurality of data units. The example method further includes maintaining a cache in a memory such that data units with a retrieval time in a first time interval are grouped contiguously in a first logical portion of the cache and data units with a retrieval time in a second time interval are grouped contiguously in a second logical portion of the cache.

Another example method for passive compaction of a cache includes determining first metadata associated with first data. The first metadata includes a first retrieval time that the first data was received. The example method also includes determining second metadata associated with second data. The second metadata includes a second retrieval time that the second data was received. The example method further includes obtaining a first metadata key including a first unique identifier. The first metadata key is associated with the first metadata. The example method also includes obtaining a second metadata key including a second unique identifier. The second metadata key is associated with the second metadata. The example method further includes generating a first data key including the first retrieval time prefixed to the first unique identifier. The first data key references the first data. The example method also includes generating a second data key including the second retrieval time prefixed to the second unique identifier. The second data key references the second data. The example method further includes writing, at a client device, the first and second data to the cache. Each of the first and second data occupy one or more contiguous blocks of physical memory in the cache, and the first and second data are stored in the cache in an order based on the relative values of the first and second retrieval times.

Other embodiments of these aspects include corresponding systems, apparatuses, and computer program products configured to perform the actions of these methods, encoded on computer storage devices.

Further features and advantages of embodiments described herein, as well as the structure and operation of various embodiments, are described in detail below with reference to the accompanying drawings. It is noted that the embodiments described below are not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS/FIGURES

Embodiments are described with reference to the accompanying drawings. The accompanying drawings, which are incorporated herein and form a part of the specification, illustrate embodiments and, together with the description, further serve to explain the principles of the embodiments and to enable a person skilled in the relevant art to make and use the embodiments. In the drawings, like reference numbers may indicate identical or functionally similar elements. The drawing in which an element first appears is generally indicated by the left-most digit in the corresponding reference number.

DETAILED DESCRIPTION

Figure 1:
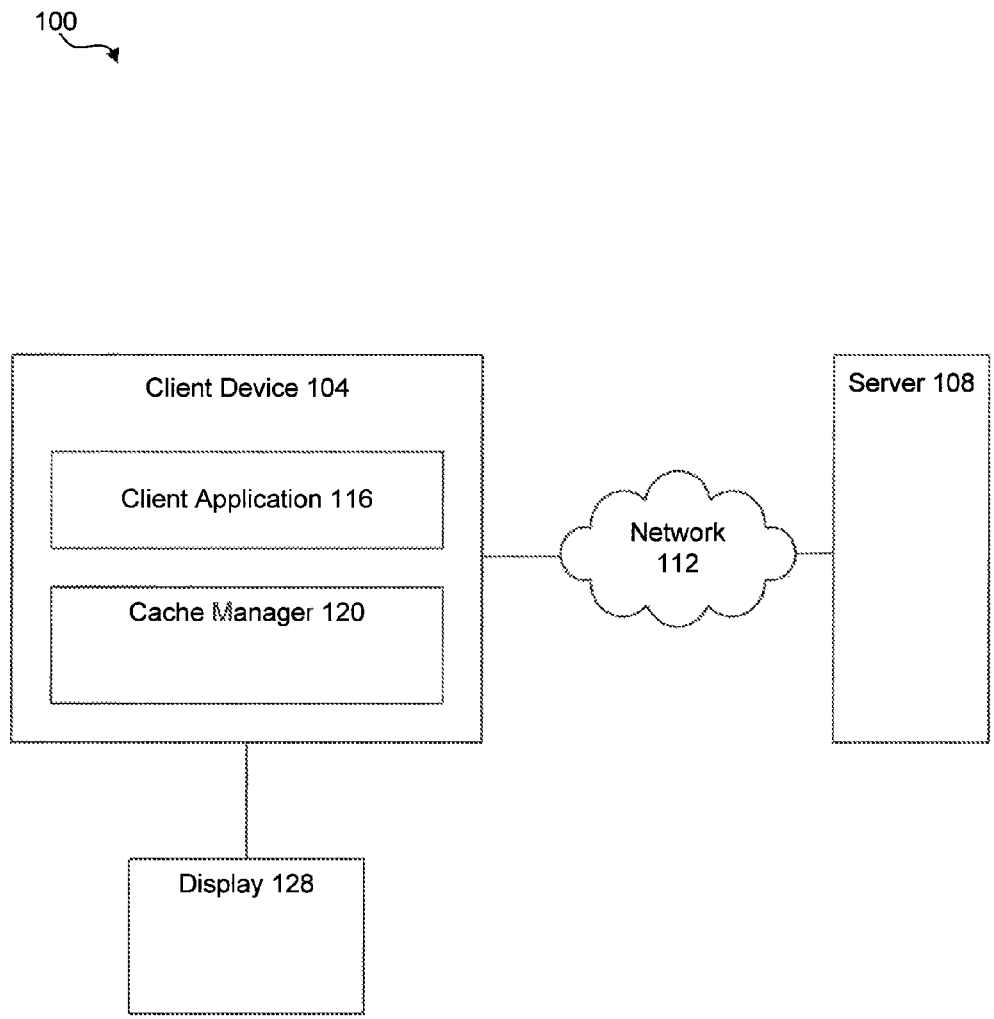
FIG. 1 is a diagram illustrating a system for passive compaction of a cache, according to an embodiment.

I. Overview
II. Example System Architectures
   A. Retrieval time
   B. Metadata and Data Keys
III. Cache Illustration Examples
IV. Geographic Information System Application
   A. Quadtree
   B. Example Client Architecture
V. Example Methods
VI. Example Computer Embodiment

I. Overview

This description generally relates to caching data received over a network. A client device may include a client application that receives data over a network and writes the data to a cache for later use. The cache may be allocated storage space in, for example, a portion of main memory or hard disk. During its lifespan, the client application may write data to and delete data from the cache. When the client application is initially started, free blocks of physical memory in the cache may be long and contiguous. Over time as the client application runs, holes in the cache may result because the data may be written to the cache in an unordered fashion. The cache may eventually need to be compacted to maintain efficiency.

To alleviate this problem, the data may be written to and stored in a cache based on a specified order, such as a retrieval time that the data was received. In this way, data stored in the cache may be ordered, such that the data occupy one or more contiguous blocks of physical memory in the cache based on the retrieval time. In this manner, the "oldest" data are physically grouped together in the cache. Accordingly, if a least recently used cache algorithm is implemented on the cache, older data in the cache may be deleted before newer data. When the older data is deleted, one or more contiguous blocks of physical memory in the cache may be released and fewer holes may result in the cache. This may enhance the performance of the client application by requiring less time for cache compaction.

In an embodiment, an example method for passive compaction of a cache includes retrieving a plurality of data units via a network interface and determining a retrieval time associated with each of the plurality of data units. The example method also includes maintaining a cache in the memory such that data units with a retrieval time (also referred to as a fetch time) in a first time interval are grouped contiguously in a first logical portion of the cache, and data units with a retrieval time in a second time interval are grouped contiguously in a second logical portion of the cache.

In an embodiment, data may be organized into metadata and actual data. An example method for passive compaction of a cache includes determining first metadata associated with first data, the first metadata including a first retrieval time that the first data was received. Second metadata associated with second data is also determined, the second metadata including a second retrieval time that the second data was received. A first metadata key including a first unique identifier is obtained, the first metadata key associated with the first metadata. A second metadata key including a second unique identifier is also obtained, the second metadata key associated with the second metadata. A first data key including the first retrieval time prefixed to the first unique identifier is generated, the first data key referencing the first data. A second data key including the second retrieval time prefixed to the second unique identifier is also generated, the second data key referencing the second data. The example method further includes writing, at a client device, the first and second data to the cache. Each of the first and second data occupy one or more contiguous blocks of physical memory in the cache, and the first and second data are stored in the cache in an order based on the relative values of the first and second retrieval times.

While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Example System Architectures

A. Retrieval Time

FIG. 1 is a diagram illustrating a system 100 for passive compaction of a cache, according to an embodiment.

System 100 includes a client device 104 that is communicatively coupled to a server 108 via a network 112. Although system 100 is described herein with reference to one client device and one server, one of skill in the art will recognize that system 100 may also include more than one client device and/or more than one server without departing from the spirit and scope of the present disclosure.

Client device 104 includes a client application 116 that requests and receives data from server 108. In an embodiment, client application 116 retrieves a plurality of data units. Client application 116 may require large amounts of data. Instead of sending a request for data each time client application 116 uses the data, client application 116 may write the data to a local cache and access the directly data from the cache.

Client device 104 also includes a cache manager 120 that writes data received over network 112 to a cache. In an embodiment, cache manager 120 determines a retrieval time associated with each of the plurality of data units. For example, client application 116 may retrieve data units during a first time interval, and at a later point in time may retrieve data units during a second time interval.

In an embodiment, cache manager 120 maintains the cache in a memory such that data units with a retrieval time in the first time interval are grouped contiguously in a first logical portion of the cache and data units with a retrieval time in the second time interval are grouped contiguously in a second logical portion of the cache.

The first and second logical portions of the cache may be contiguously allocated. If data units are subsequently retrieved during a third time interval, the data units with the retrieval time in the third time interval may be grouped contiguously in a third logical portion of the cache, and the second and third logical portions of the cache may be contiguously allocated. In this way, data stored in the cache may be grouped such that the oldest data are arranged together from oldest to newest in the cache based on their relative retrieval times.

Cache manager 120 may implement a least recently used (LRU) cache algorithm on the cache. When an LRU pass purges old data, the oldest values may be deleted first because the old data are grouped contiguously in a logical portion of the cache. A passive cache compaction may occur because the old data, which are in close proximity to each other, are deleted and holes in the cache may be reduced.

The retrieval time is a value that increases over time. In an example, the retrieval time is based on a global time at which the data was retrieved. In another example, the retrieval time is based on a value of a monotonic counter that is maintained by cache manager 120 and increases for each newly received data.

Client device 104 is coupled to a display device 128. Client application 116 may process the data and display it to the user via display device 128. Display device 128 can be, for example and without limitation, a liquid crystal display, a plasma display, a variable graphics array (VGA) display, a super VGA display, a cathode ray tube display, and other similar types of display devices. In an embodiment, display device 128 can be configured to display a graphical user interface (GUI) that provides an interface between a user and computer system 100 or client application 116 running on client device 104 (also referred to herein as a "system application").

Client device 104 may be any computing device. Similarly, server 108 may be implemented using any computing device capable of serving data to the client. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet, or mobile computing device), rack server, set-top box, or other type of computer system having at least one processor and memory. A computing process performed by a clustered computing environment or server farm may be carried out across multiple processors located at the same or different locations. Such a computing device may include software, firmware, hardware, or a combination thereof. Software may include one or more applications and an operating system. Hardware may include, but is not limited to, a processor, memory and user interface display.

Client application 116 may be, for example, a web browser. A web browser is a software application that allows a user to view or download content that is available on a network, such as on a website on the World Wide Web. Content may include, for example and without limitation, text, files, images, audio, video and personal communications. A web page presents such content and is located using a uniform resource identifier (URI) such as a uniform resource locator (URL). A web page may be retrieved using the Internet Protocol (IP) address of the computer holding the web page content. A browser may use a number of protocols and standards to obtain or manage content flow. A browser may use HTTP to fetch content and web pages. HTTP can be used for requesting and retrieving objects from a server. In another embodiment, client application 116 may be a GIS application that displays geographic content to a user.

Server 108 can be, for example and without limitation, a telecommunications server, a web server, or other type of database server that supports web protocols such as HTTP. For example, server 108 may be a web server containing web applications that generate content in response to an HTTP request. The web server may package the generated content and serve the content to a client in the form of an HTTP response. A web server may be a software component that responds to an HTTP request with an HTTP reply. As illustrative examples, the web server may be, without limitation, Apache HTTP Server, Apache Tomcat, Microsoft Internet Information Server, JBoss Application Server, WebLogic Application Server, or Sun Java System Web Server. The web server may serve content such as hypertext markup language (HTML), extendable markup language (XML), documents, videos, images, multimedia features, or any combination thereof. In another embodiment, server 108 may be a GIS server that provides geographic information to a user. These examples are strictly illustrative and are not intended to limit the present disclosure.

In an embodiment, system 100 may be configured to handle HTTP. In another embodiment, system 100 may be configured to handle other protocols involved in internet or network communication. Network 112 may be any network or combination of networks that can carry data communication, and may be referred to herein as a computer network. Such network 112 may include, but is not limited to, a wired (e.g., Ethernet) or a wireless (e.g., Wi-Fi and 3G) network, a local area network, medium area network, and/or wide area network such as the Internet. Network 112 may support protocols and technology including, but not limited to, World Wide Web protocols and/or services. Intermediate web servers, gateways, or other servers may be provided between components of communication system 100 depending upon a particular application or environment.

B. Metadata and Data Keys

Figure 2:
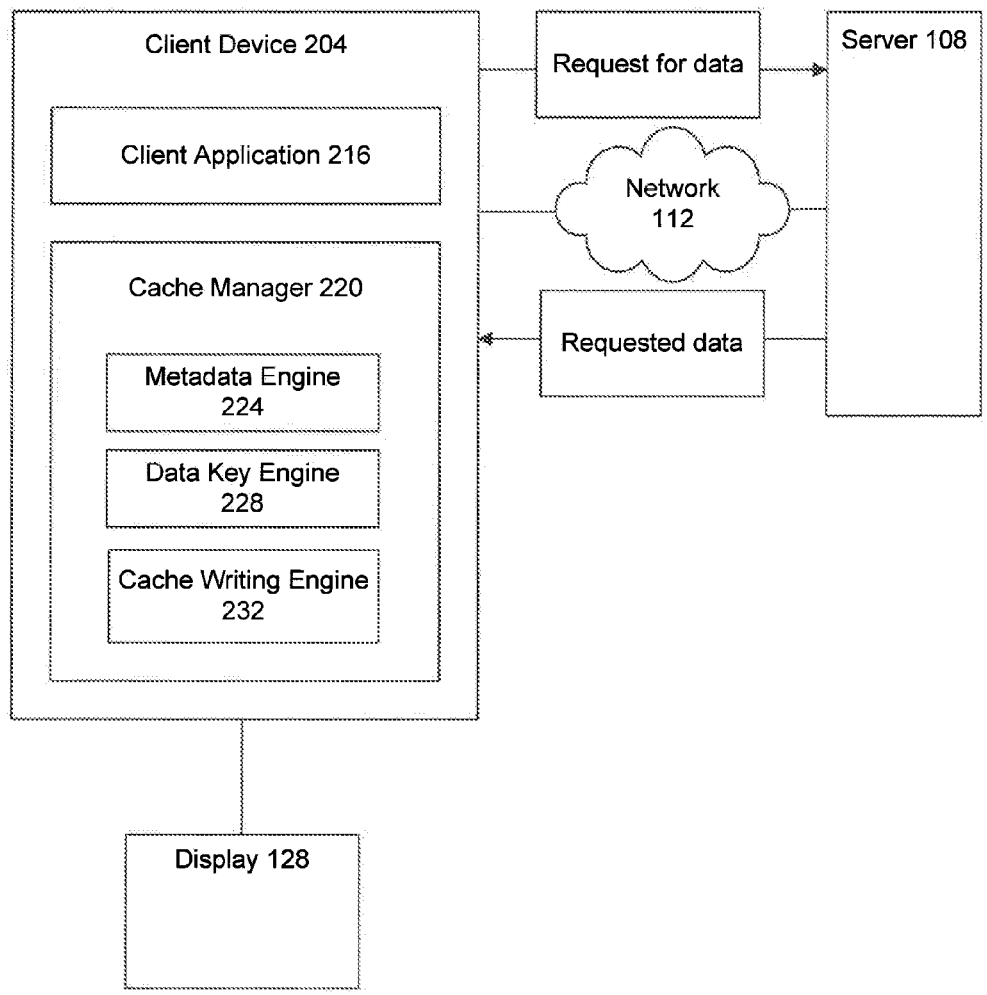
FIG. 2 is a diagram illustrating another system for passive compaction of a cache, according to an embodiment.

FIG. 2 is a diagram illustrating another system 200 for passive compaction of a cache, according to an embodiment.

System 200 includes client device 204 that is communicatively coupled to server 108 via network 112. Client device 204 includes an application 216 that requests and receives data from server 108. Application 216 may be, for example and without limitation, a browser or a standalone GIS application. The request may include a unique identifier indicating the data to be rendered.

Client device 204 also includes a cache manager 220 that writes the data to a cache. Cache manager 220 may write the data to the cache based on a retrieval time of the data. In an embodiment, the cache is stored on a hard disk at client device 204. In another embodiment, the cache is maintained in a main memory at client device 204.

The cache may be based on, for example, a key-value storage library that provides an ordered mapping from string keys to string values. The storage library may be, for example, a non-relational database that stores key-value pairs in the cache. In an embodiment, the cache is built on top of the key-value storage library, and the data is organized into metadata and the actual data. The metadata is information about a specific set of data stored in the cache, and this information may be used, for example, when the LRU algorithm is implemented on the cache. The actual data may represent data to be rendered at the client device and is stored in the cache.

In an embodiment, two different key types are used to access the actual data. The first key type is a metadata key that may be used to identify metadata associated with the actual data, and the second key type is a data key that may be used to identify the actual data. More details on these keys are presented below.

Cache manager 220 includes a metadata engine 224, data key engine 228, and cache writing engine 232. In an embodiment, metadata engine 224 determines metadata associated with the requested data. The metadata may include information such as a retrieval time that the data was first received, an access time that the data was most recently accessed, and how often the data was accessed within a given time period.

Metadata engine 224 may obtain a metadata key that is used to identify the corresponding metadata. The metadata key may include a unique identifier. In an example, the unique identifier represents a location where the received data is stored at a server. For example, the unique identifier may be a uniform resource locator (URL) or a representation of a URL. In this example, the unique identifier does not indicate an order. The metadata key may include data in addition to the unique identifier. For example, the metadata key may include a constant value prefixed to the unique identifier, where the constant value identifies the key as a metadata key. The constant value may be used to order the metadata in the database, for example, at the server. The metadata may also be prefetched into main memory based on the constant value.

The retrieval time included in the metadata may be used to fetch the actual data to be rendered to a user. For example, the same retrieval time included in the metadata may also be included in a data key that references the actual data. Although examples herein refer to the retrieval time as an actual time stamp, one of skill in the art will recognize that any value representing an age of the data may instead be used. For example, any value that increases over time may be suitable to satisfy this functionality.

In an embodiment, data key engine 228 generates a data key including the retrieval time prefixed to the unique identifier. In an example, the data key begins with the retrieval time, and the retrieval time is stored in big-endian order. The data keys may be sorted based on the retrieval times so that when the data is written to disk, the data is written to disk based on an order of the data key. In this way, the data may be stored in the cache in an order that the data was originally fetched.

In an embodiment, cache writing engine 232 writes, at a client device, the data to the cache. In an example, application 216 requests first data and second data, and cache writing engine 232 writes the first and second data to the cache such that each of the first and second data occupy one or more contiguous blocks of physical memory in the cache. The first and second data are stored in the cache in an order based on the relative values of the retrieval times of the first and second data. In other words, the data in the cache may be contiguously allocated based on an order in which the first and second data were fetched.

The old data are located in close proximity to each other. An LRU algorithm may be implemented on the cache, and the data that was least recently used may be deleted to make room for new data. As such, when the LRU algorithm is implemented on the cache, large sets of data near each other are purged at the same time. When the old data are deleted, large sets of contiguous memory may be freed, effectively resulting in a passive cache compaction. A portion of the cache may be purged, and subsequently a view may be rendered using data retrieved from the cache. The purged cache may include fewer holes because the older data are grouped together and may be deleted all together, freeing contiguous blocks of physical memory that stored the first and second data in the cache. This may result in a greater number of freed contiguous blocks of physical memory compared to if the older data were not grouped together.

In an embodiment, as will be described below in further detail, application 216 may be a GIS application that displays, for example, a virtual terrain. The data in the first logical portion may represent a first geographic area and the data in the second logical portion may represent a second geographic area.

When application 216 receives GIS data from a server, application 216 may process the data and render a an image (such as a virtual terrain corresponding to the data) for a user via display device 128. The user may subsequently request the data that was written to the cache again. The request may include a unique identifier that is used to access the data. Rather than requesting the data from server 108, application 216 may read the data from the cache using the unique identifier.

Reading the data from the cache may include identifying metadata associated with a given unique identifier and identifying a retrieval time included in the identified metadata. The retrieval time is also included in a data key that references the cached data to be rendered. In an example, a data key including the identified retrieval time prefixed to the given unique identifier may be determined. The cached data may be read from the cache based on the data key.

If the metadata includes a last access time, a time that the cached data was read may be determined, and an access time included in the identified metadata may be updated with the determined time that the cached data was read.

III. Cache Illustration Examples

Figure 3:
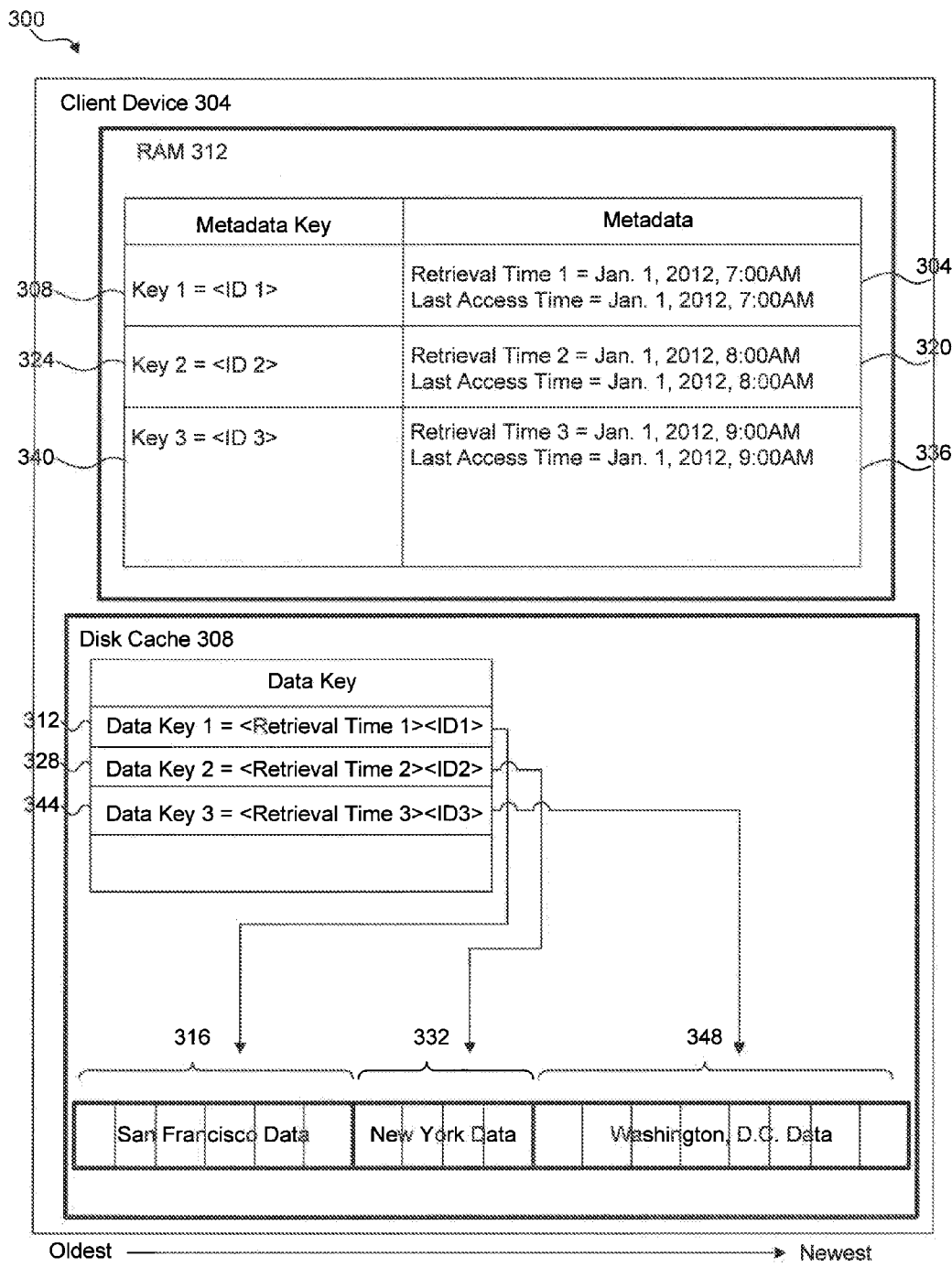
FIG. 3 is a diagram illustrating data written to a cache based on a retrieval time, according to an embodiment.

FIG. 3 is a diagram 300 illustrating data written to a cache based on a retrieval time, according to an embodiment. In this example, the application may be a GIS application, and the fetched data corresponds to various geographic locations requested for display by a user. However, one of skill in the art will recognize that a similar caching scheme may be used for other types of applications, such as web browsing or gaming.

Diagram 300 includes a client device 304. The client device 304 may cache two sets of data. In an embodiment, the first set of locally cached data resides in RAM (random access memory). This information may be retrieved quickly and vanishes when the user exits the application. The second set of locally cached data may be stored on a disk cache. In an example, if data is stored in the disk cache and the user exits the application, when the user subsequently launches the application and the application needs to access the data, the data may be read directly from the disk cache rather than downloading it again over the network.

The metadata and actual data may be stored in the same database. The metadata may include a small amount of memory that resides in RAM 312.

In diagram 300, client device 304 includes a disk cache 308 and a RAM 312. The client application may enable the user to set a maximum memory cache size and a maximum disk cache size. For example, the user may set the maximum memory cache size to 500 Megabytes and the maximum disk cache size to 2 Gigabytes. In an embodiment, a cache status key may store a current state of the cache. The current state of the cache may include information such as a size of the cache, a number of entries in the cache, and the maximum cache size.

Application 216 may write data received over network 112 to disk cache 308. In the example of a GIS application, the requested data may be, for instance, a representation of a geographic area. In an example, application 216 sends a request for San Francisco data to server 108, and server 108 sends a response including the San Francisco data to application 216 in response to the request. Application 216 receives and processes the San Francisco data. Browser 116 may then render an image that displays a view of San Francisco for a user via display device 128.

Metadata key engine 224 may determine metadata 304 associated with the San Francisco data. Metadata 304 includes a first retrieval time of "Jan. 1, 2012 at 7:00 A.M." that the San Francisco data was received, for example, at application 216. Metadata 304 also includes an access time that the San Francisco data was most recently read. In the embodiment of FIG. 1, the access time is initially set to the retrieval time. In another embodiment, the access time is initially a null value, and is updated to a time that the San Francisco data is subsequently accessed from disk cache 308.

Metadata key engine 224 may obtain a metadata key "Key 1" 308 that includes a first unique identifier "ID 1." Metadata key "Key 1" 308 corresponds to metadata 304. Data key engine 228 may generate a data key "Data Key 1" 312 that includes the first retrieval time prefixed to the first unique identifier. Data key "Data Key 1" 312 references the San Francisco data in the cache. Cache writing engine 232 may write the San Francisco data to contiguous blocks of physical memory 316 in disk cache 308.

Application 216 may send a subsequent request for New York data to server 108, and server 108 may send a response including the New York data to application 216 in response to the request. Application 216 receives and processes the New York data. Application 116 may then render an image that displays a view of New York for the user via display device 128.

Metadata key engine 224 may determine metadata 320 associated with the New York data. Metadata 320 includes a second retrieval time of "Jan. 1, 2012 at 8:00 A.M." that the New York data was received, for example, at application 216. Metadata 320 also includes an access time that the New York data was most recently read.

Metadata key engine 224 may obtain a metadata key "Key 2" 324 that includes a second unique identifier "ID 2." Metadata key "Key 2" 324 corresponds to metadata 320. Data key engine 228 may generate a data key "Data Key 2" 328 that includes the second retrieval time prefixed to the second unique identifier. Data key "Data Key 2" 328 references the New York data in the cache. Cache writing engine 232 may write the New York data to contiguous blocks of physical memory 332 in disk cache 308.

Application 216 may send a subsequent request for Washington, D.C. data to server 108, and server 108 may send a response including the Washington, D.C. data to application 216 in response to the request. Application 216 receives and processes the Washington, D.C. data. Browser 116 may then render an image that displays a view of Washington, D.C. for the user via display device 128.

Metadata key engine 224 may determine metadata 336 associated with the Washington, D.C. data. Metadata 336 includes a third retrieval time of "Jan. 1, 2012 at 9:00 A.M." that the Washington, D.C. data was received, for example, at application 216. Metadata 336 also includes an access time that the Washington, D.C. data was most recently read.

Metadata key engine 224 may obtain a metadata key "Key 3" 340 that includes a third unique identifier "ID 3." Metadata key "Key 3" 340 corresponds to metadata 336. Data key engine 228 may generate a data key "Data Key 3" 344 that includes the third retrieval time prefixed to the third unique identifier. Data key "Data Key 3" 344 references the Washington, D.C. data in the cache.

Cache writing engine 232 may write the Washington, D.C. data to contiguous blocks of physical memory 348 in disk cache 308. For example, the data keys and data may be stored in temporary storage (e.g., RAM) and eventually written to disk. The data keys may be stored in a database and begin with the retrieval time stored in big-endian order, and the data keys may be sorted based on the retrieval time included in the corresponding data key. When the data is written to disk from the temporary storage, the data may be written to disk based on an order of the data keys.

In the example illustrated in FIG. 3, the San Francisco, New York, and Washington, D.C. data are stored contiguously in the cache based on the retrieval time included in the data keys. Based on the retrieval time, cache writing engine 232 may write, at client device 304, the San Francisco, New York, and Washington, D.C. data to cache 308 such that each of the San Francisco, New York, and Washington, D.C. Data occupy one or more contiguous blocks of physical memory in the cache. As a result, the San Francisco, New York, and Washington, D.C. data are stored in the cache in an order based on the relative values of their respective retrieval times. In this way, the data may be stored in the cache based on oldest to most recent retrieval times.

Figure 4:
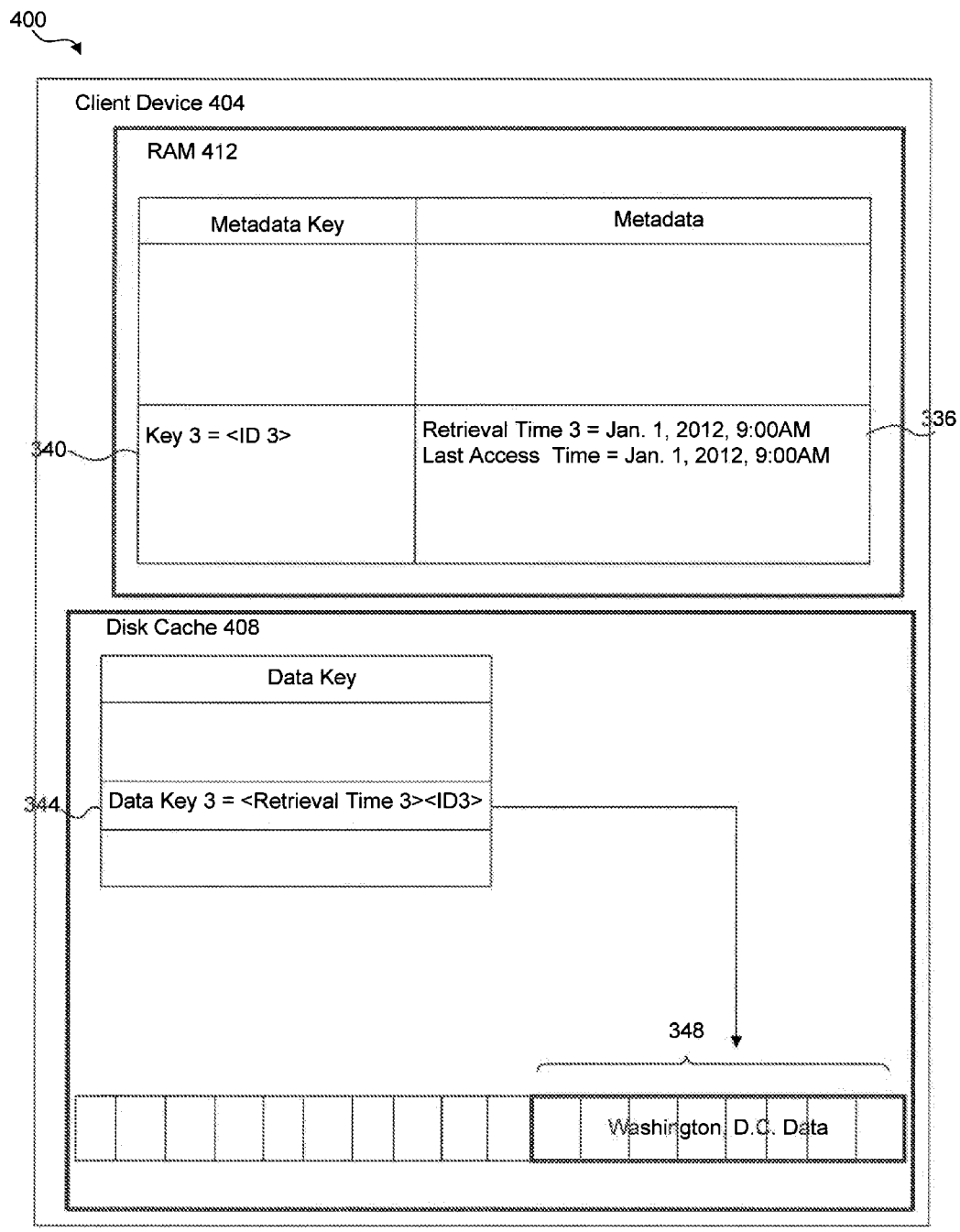
FIG. 4 is a diagram illustrating data being deleted from the cache in FIG. 3 using a least recently used (LRU) algorithm based on retrieval times, according to an embodiment.

In an embodiment, cache manager 220 may implement an LRU algorithm to clear disk cache 308 based on retrieval times. FIG. 4 is a diagram 400 illustrating data being deleted from disk cache 308 in FIG. 3 using an LRU algorithm based on retrieval times, according to an embodiment. In FIG. 3, the San Francisco data is the oldest data in terms of retrieval time and was retrieved on Jan. 1, 2012 at 7:00 A.M., the New York data is the second oldest data in terms of retrieval time and was retrieved on Jan. 1, 2012 at 8:00 A.M., and the Washington, D.C. data is the newest data in terms of retrieval time and was retrieved on Jan. 1, 2012 at 9:00 A.M.

In an embodiment, to implement the LRU cache algorithm on disk cache 308, cache manager 220 determines whether a given metadata satisfies a condition based on a retrieval time or access time included in the given metadata. In an example, the given metadata satisfies the condition when the retrieval time or access time included in the given metadata is older than a threshold retrieval time or access time, or based on a comparison of retrieval time and access time for another metadata. Cache manager 220 may identify the oldest data or the least recently used data in disk cache 308 based on the retrieval time or access time included in the associated metadata.

Cache manager 220 may identify a data key that includes the same retrieval time included in the given metadata that satisfies the condition. In an example, cache manager 220 determines that metadata 304 satisfies the condition based on a retrieval time or access time of Jan. 1, 2012 at 7:00 A.M. included in metadata 304. Cache manager 220 identifies data key "Data Key 1" 312 including the same retrieval time of Jan. 1, 2012 at 7:00 A.M. included in metadata 304.

In an embodiment, cache manager 220 deletes the data referenced by the identified data key from disk cache 308. As such, cache manager 220 may delete the data in contiguous blocks of physical memory 316. In this embodiment, cache manager 220 may also delete the identified data key, the reference from the identified data key to the deleted data, and the metadata that satisfies the condition.

In an example, cache manager 220 may delete from disk cache 308 the San Francisco data referenced by data key "Data Key 1" 312. Cache manager 220 may also delete the New York data in a similar manner. Data retrieved before other data may be deleted before the other data.

The relatively oldest data in disk cache 308 may be deleted to make room for new data. In FIG. 4, the San Francisco and New York data have been deleted along with the data keys that reference the San Francisco and New York data, the references from the identified data keys to the deleted data, and the metadata associated with the San Francisco and New York data.

Storing data in a cache based on a retrieval time has advantages. The older data (e.g., the San Francisco and New York data) occupied one or more contiguous blocks of physical memory in the cache. Accordingly, when this data is deleted, contiguous blocks of physical memory 316 and 332 are freed. This may effectively result in a passive cache compaction. In contrast, if the San Francisco and New York data were stored at random locations in the cache, holes in the cache may result when the San Francisco and New York data are deleted.

In another embodiment, cache manager 220 marks the data associated with metadata that satisfies a condition as deleted. The data may be marked in disk cache 308 as one of the relatively older entries, and marked data may not be read from the cache. Cache manager 220 may mark the relatively older data by, for example, setting a flag bit. New data may be written to the marked locations in disk cache 308 and may overwrite the data stored at these marked locations.

Figure 5:
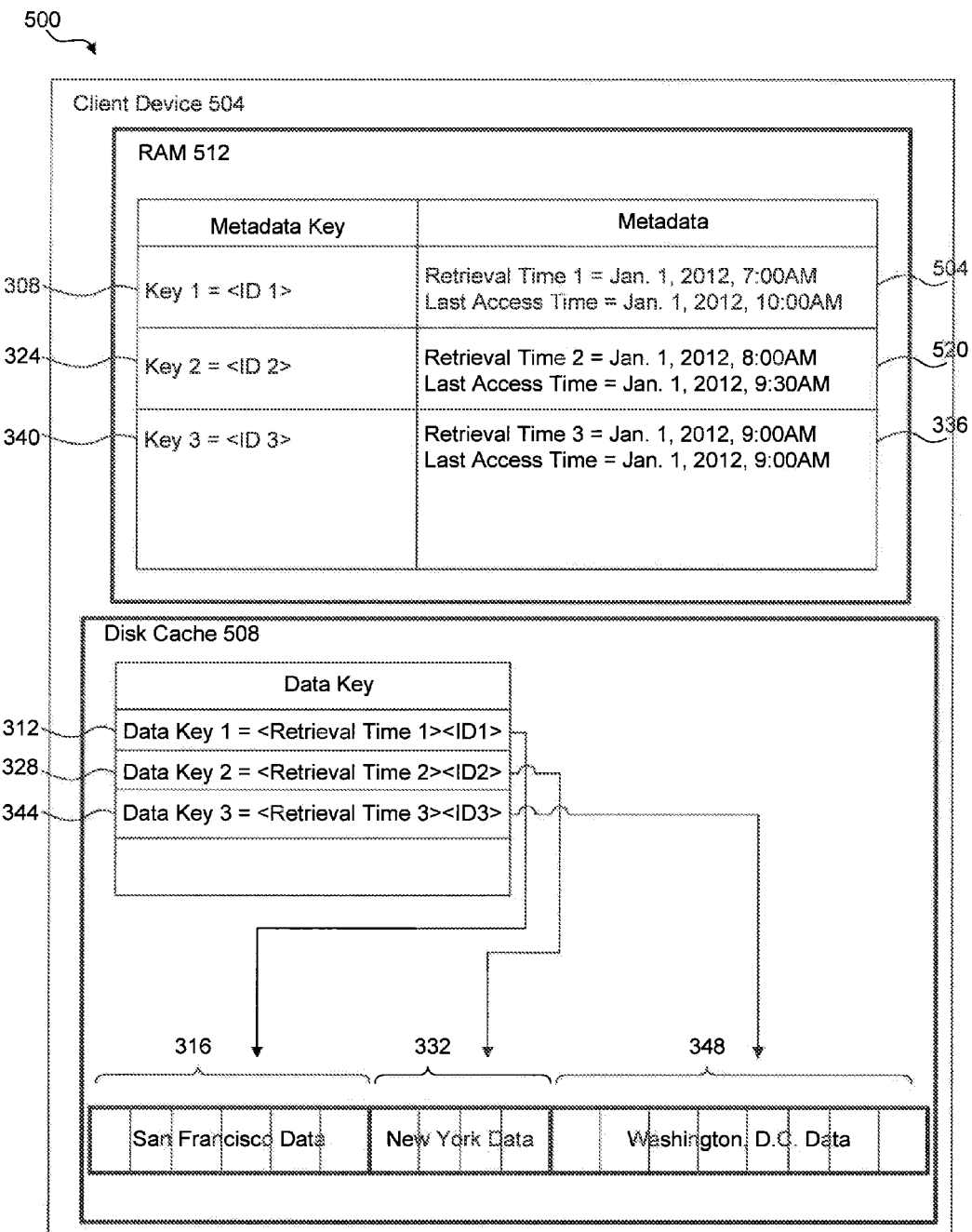
FIG. 5 is a diagram illustrating data being accessed from the cache in FIG. 3, according to an embodiment.

FIG. 5 is a diagram 500 illustrating data being accessed from disk cache 308 in FIG. 3, according to an embodiment. In FIG. 5, the user requests the San Francisco data and subsequently requests the New York data and then the Washington, D.C. data. After viewing Washington, D.C., the user may desire to view New York again. Rather than requesting the New York data from a server again, client device 504 may read the New York data from disk cache 508.

Metadata engine 224 may receive a request for the cached New York data to be rendered. The request may include a given unique identifier that identifies the New York data. For example, the user's request to view New York may include "ID 2," which identifies the requested data. Metadata engine 224 may identify metadata associated with the given unique identifier. In an example, metadata engine 224 identifies metadata 520 associated with unique identifier "ID 2."

Data key engine 228 may identify a retrieval time included in the identified metadata and determine a data key including the identified retrieval time prefixed to the given unique identifier. The data key references the cached data to be rendered. In an example, data key engine 228 identifies a retrieval time of "Jan. 1, 2012 at 8:00 A.M." included in identified metadata 520 and determines data key "Data Key 2" 328 including the identified retrieval time prefixed to the given unique identifier.

Cache writing engine 232 may read, from disk cache 508, the cached New York data to be rendered based on the determined data key. The cached New York data may then be loaded in application 216 and rendered for a user.

Cache writing engine 232 may determine a time that the cached New York data was read and then update an access time included in the identified metadata with the determined time that the cached data was read. In FIG. 5, cache writing engine 232 determines a time that the cached New York data was read to be "Jan. 1, 2012 at 9:30 A.M." and updates the last access time to this determined time.

The San Francisco metadata may be updated in a similar manner. In FIG. 5, the user viewed San Francisco after viewing the cached New York data. In FIG. 5, cache writing engine 232 determines a time that the cached San Francisco data was read to be "Jan. 1, 2012 at 10:00 A.M." and updates the last access time to this determined time. In this way, cache manager 220 may identify when data in disk cache 308 was most recently accessed, and this information may be used to determine which data is relatively older compared to other data.

Figure 6:
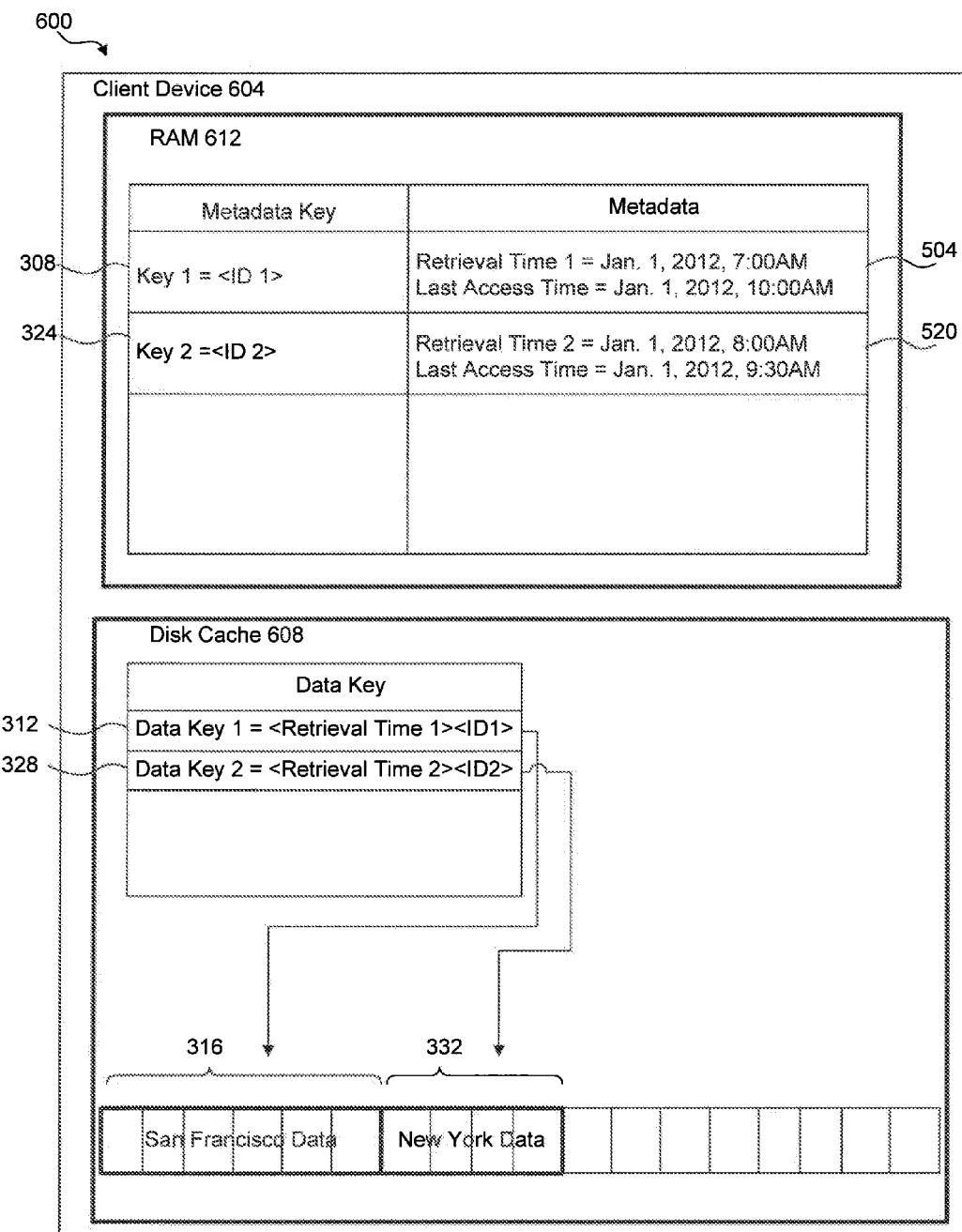
FIG. 6 is a diagram illustrating data being deleted from the cache in FIG. 5 based on a retrieval time and access time, according to an embodiment.

FIG. 6 is a diagram 600 illustrating data being deleted from disk cache 508 in FIG. 5 based on a retrieval time and access time, according to an embodiment.

In FIG. 5, the Washington, D.C. data are the least recently used data in disk cache 508, and the most recent access of the Washington, D.C. data was on Jan. 1, 2012 at 9:00 A.M. The Washington, D.C. data is associated with metadata 336. Data key engine 228 may determine that metadata 336 satisfies a condition based on the retrieval time or access time included in metadata 336.

Data key engine 228 may identify a data key that includes the same retrieval time included in the metadata associated with the Washington, D.C. data. In the embodiment of FIG. 5, cache writing engine 232 deletes the data referenced by the identified data key from disk cache 508, the identified data key, the reference from the identified data key to the deleted data, and the metadata that satisfies the condition. In another embodiment, cache writing engine 232 marks the data referenced by the identified data key in the cache as deleted. Cache writing engine 232 may mark the data in the cache as deleted by, for example, setting a flag bit.

As illustrated in FIG. 5, an order that the data was fetched was the San Francisco data, the New York data, and then the Washington, D.C. data, and the most recently accessed data are the San Francisco data and the New York data. The Washington D.C. data are therefore deleted before the San Francisco and New York data. In this way, data that have not been viewed by the user for a while compared to other data in the cache may be deleted before the more recently accessed data are deleted.

Further, the deleted data may be data that were viewed together by the user. For example, the user viewed New York and then San Francisco, and data associated with these viewings are stored contiguously in disk cache 508. When a cache compaction occurs, the cache may be compacted quickly because the data in the cache is grouped together by the retrieval time.

IV. Geographic Information System Application

An example application that receives data at a client is a geographic information system (GIS) application. A GIS is a system for archiving, retrieving, displaying, or manipulating data indexed according to the data elements' geographic coordinates. The data elements may be a variety of data types such as, for example, satellite imagery, maps, models of buildings and terrain, and other geographic features. A GIS application communicates with a server to retrieve data that is requested for display at a client device. The client device may cache the data received in response to a request.

The GIS application may be a real-time three-dimensional application, and usability of the GIS application may depend on displaying content quickly and smoothly to a user. During cache compaction, the cache may be locked and inaccessible to the GIS application. Accordingly, the user may "fly" around the world and see a smooth three-dimensional view, but when a cache compaction occurs the user may see a 2-3 second glitch while the cache is being compacted. This may be disruptive to the user experience.

A. Quadtree

Data associated with geographic information may be stored in a database characterized by a hierarchical data structure such as a quadtree structure. Quadtrees are composed of quad nodes and leaves. Quadtree nodes are elements which have children node descendants. Quadtree leaves, meanwhile, are node elements which have no children.

Figure 7:
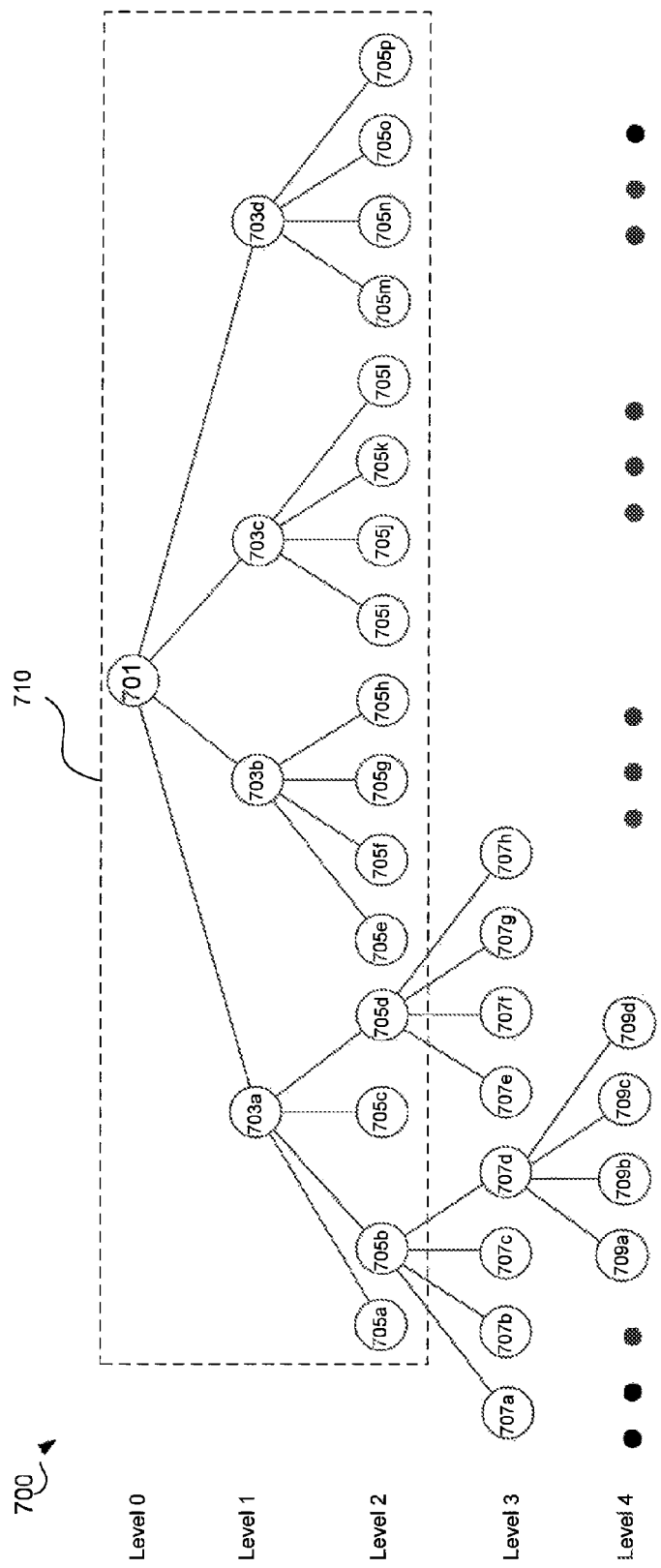
FIG. 7 is a diagram illustrating an example quadtree represented as a tree structure, according to an embodiment.

FIG. 7 is a diagram illustrating an example quadtree represented as a tree structure, according to an embodiment. In an embodiment, a quadtree is used to partition a surface of the Earth into subregions. Each subregion may be bounded by latitude and longitude values. Displaying views of the Earth include requesting, loading, and storing cache nodes. Data in a cache may be ordered based on an order in which the user traverses quadtree 700. In an example, the GIS may enable a user to "fly" into a geographic area. As the user zooms into the geographic area, the resolution imagery increases, and this data may be written to a cache at the client device.

In example quadtree 700, each parent node has exactly four children descendants. A root node 701 has exactly four children, 703a-703d. Each node at level of detail 1 also has four children, as shown at level of detail 2. Each level of a quadtree possesses four times as many nodes as its previous level.

A node is a data structure that may point to a payload of data and up to four references to other files, each of which in turn may be a quad node. In some instances, the payload of data is empty. The files referenced by a quad node are referred to as the children of that quad node, and the referencing quad node is referred to as the parent. In some cases, a file contains not only the referenced child, but descendants of that child as well. These aggregates are known as cache nodes and may include several quad nodes. Such aggregation takes place in the course of database construction.

Cache nodes may represent pieces of data that the client device needs to resolve the current three-dimensional view. The cache nodes may be located within a field of view of a virtual camera that defines a perspective to view content of the three-dimensional environment. A client device may request cache node 710, which may be within a field of view of the virtual camera. Cache node 710 includes root node 701, its four children, 703a-703d, and their respective children, 705a-705p.

B. Example Client Architecture

Figure 8:
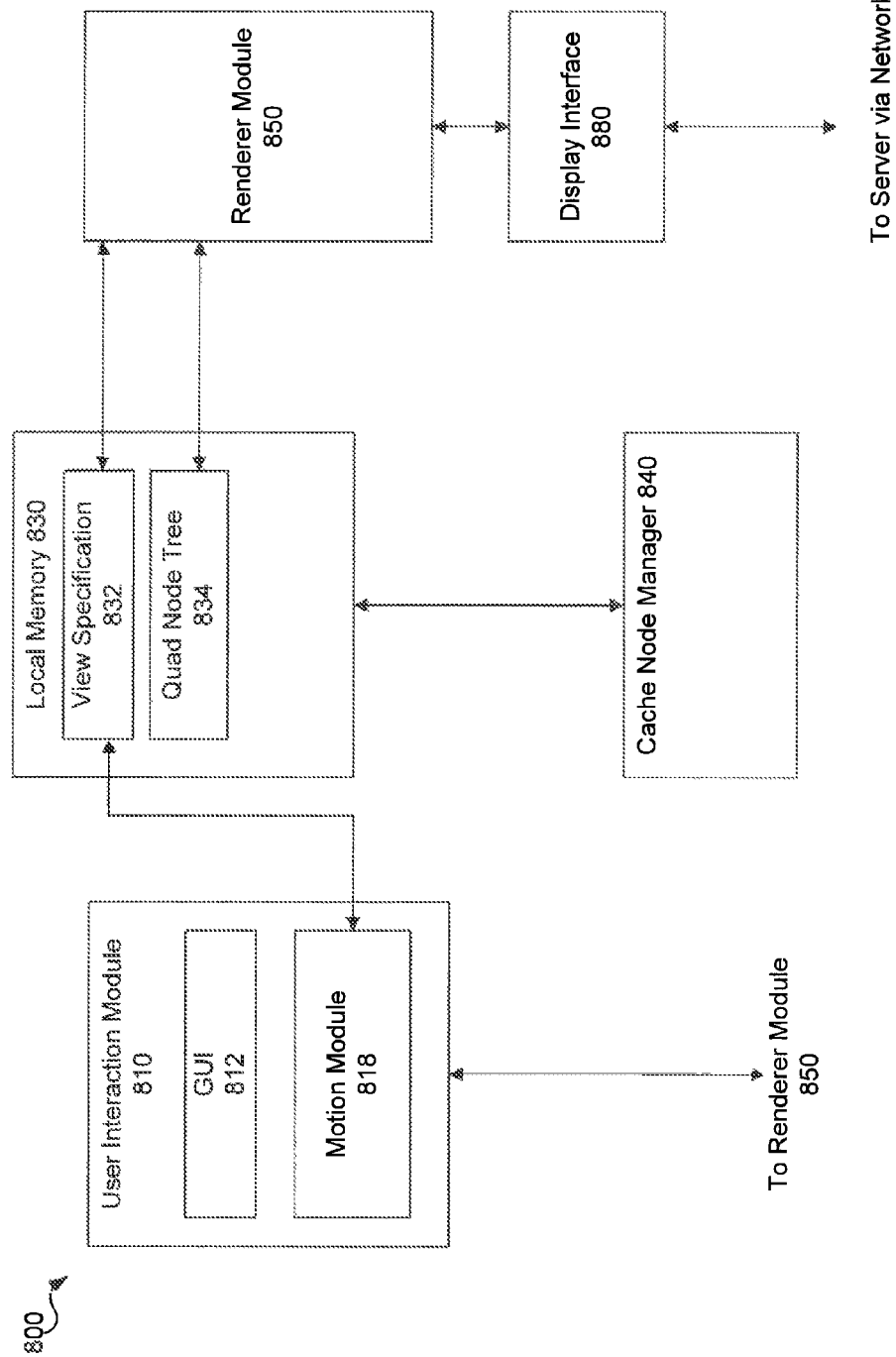
FIG. 8 is a diagram illustrating an architecture diagram of an example client of a geographic information system (GIS), according to an embodiment.

FIG. 8 is a diagram illustrating an architecture diagram of an example client of a GIS 800, according to an embodiment. In an embodiment, client 800 includes a user interaction module 810, local memory 830, cache node manager 840, renderer module 850, and display interface 880.

In an embodiment, the components of client 800 can be implemented, for example, as software running on a client machine. Client 800 interacts with a GIS server (not shown) to bring images of the Earth and other geospatial data to client 800 for viewing by a user. Together, the images of the Earth and other geospatial data form a three-dimensional model in a three-dimensional environment. In an embodiment, software objects are grouped according to functions that can run asynchronously (e.g., time independently) from one another.

User interaction module 810 includes a graphical user interface (GUI) 812 and motion module 818. Local memory 830 includes a view specification 832 and quad node tree 834.

In an embodiment, client 800 operates as follows. User interaction module 810 receives user input regarding a location that a user desires to view and, through motion module 818, constructs view specification 832. In an embodiment, a user inputs location information using GUI 812. This results, for example, in the generation of view specification 832. View specification 832 defines a virtual camera's viewable volume within a three-dimensional space, known as a frustum, and the position and orientation of the frustum with respect, for example, to a three-dimensional map.

In an embodiment, the frustum is in the shape of a truncated pyramid. The frustum has minimum and maximum view distances that can change depending on the viewing circumstances. As a user's view of a three-dimensional map is manipulated using GUI 812, the orientation and position of the frustum changes with respect to the three-dimensional map. Thus, as user input is received, view specification 832 changes. View specification 832 is placed in local memory 830, where it is used by renderer module 850. In an embodiment, renderer module 850 uses view specification 832 to render data for display.

Motion module 818 uses location information received via GUI 812 to adjust the position or orientation of a virtual camera. The camera is used, for example, for viewing a displayed three-dimensional model of the Earth. A user sees a displayed three-dimensional model on his or her computer monitor from the standpoint of the virtual camera. In an embodiment, motion module 818 also determines view specification 832 based on the position of the virtual camera, the orientation of the virtual camera, and the horizontal and vertical fields of view of the virtual camera.

In an embodiment, cache node manager 840 builds a quad node tree 834 by populating it with quad nodes based on view specification 832. In an embodiment, cache node manager 840 identifies which cache nodes are needed from the server to resolve a review and requests these cache nodes. The cache nodes from the server may be written to a local cache for later use.

In an embodiment, cache node manager 840 determines metadata associated with a received cache node and determines a retrieval time that the cache node was received. The metadata may include the retrieval time that the cache node was received.

In an example, cache node manager 840 identifies a unique identifier of the cache nodes that are needed to resolve a view. The metadata key may include the unique identifier and be associated with the metadata. In an example, a unique identifier for node 701 includes "701" and one or more types of data included in node 701. For example, an identifier for node 701 may be "701imageryterrain" or "imageryandterrain701."

In an embodiment, cache node manager 840 obtains the metadata key including the unique identifier and generates a data key including the retrieval time prefixed to the unique identifier. The data key references the actual data stored in the cache node and is used to fetch the actual data to be rendered.

Cache node manager 840 writes cache nodes to the cache based on an order in which the user traverses quadtree 700. In an example, cache node manager 840 writes cache nodes to the cache based on the relative retrieval times of the cache nodes. The cache nodes occupy one or more contiguous blocks of physical memory in the cache.

Display interface 880 (e.g., a display interface card) is configured to allow data from a mapping module to be sent to a display associated with the user's computer so that the user can view the data. Display interface 880 can be implemented with conventional technology.

V. Example Methods

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 9:
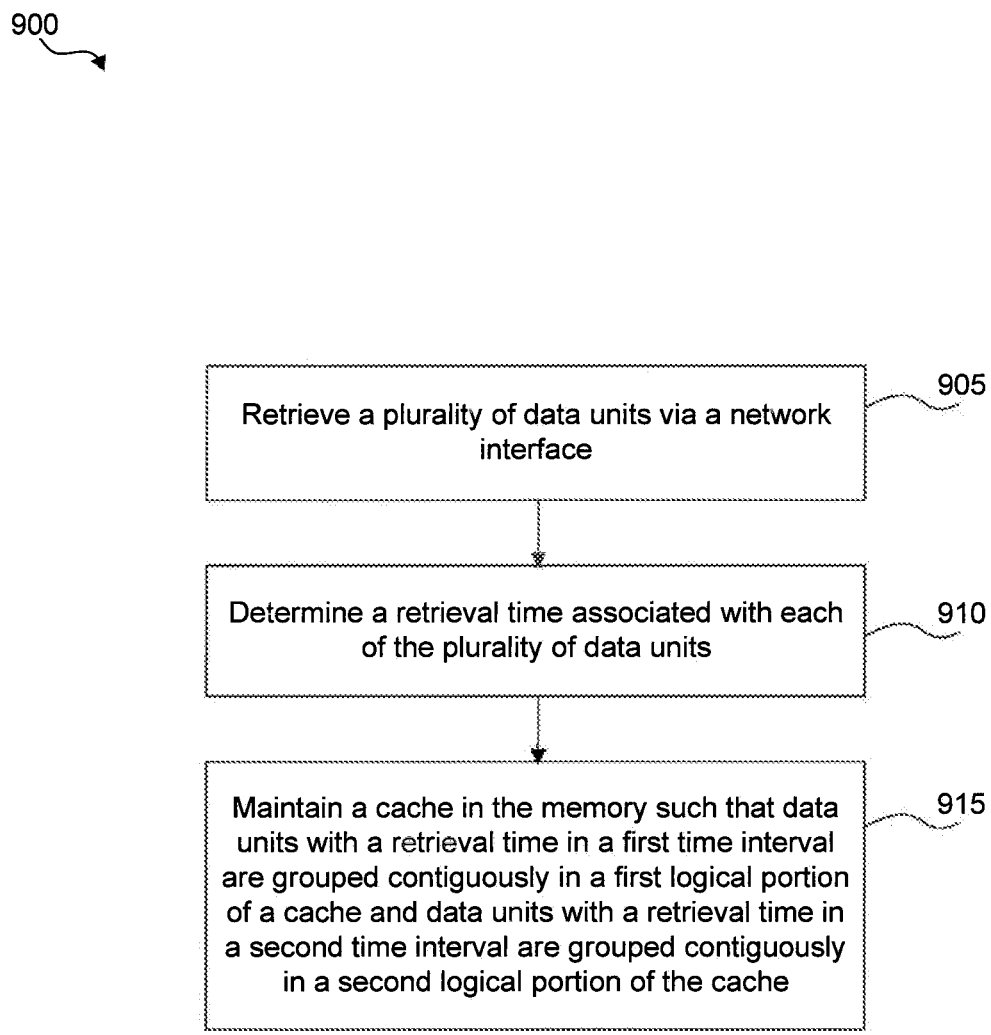
FIG. 9 is a flowchart of an example method for passive compaction of a cache, according to an embodiment.
Figure 10:
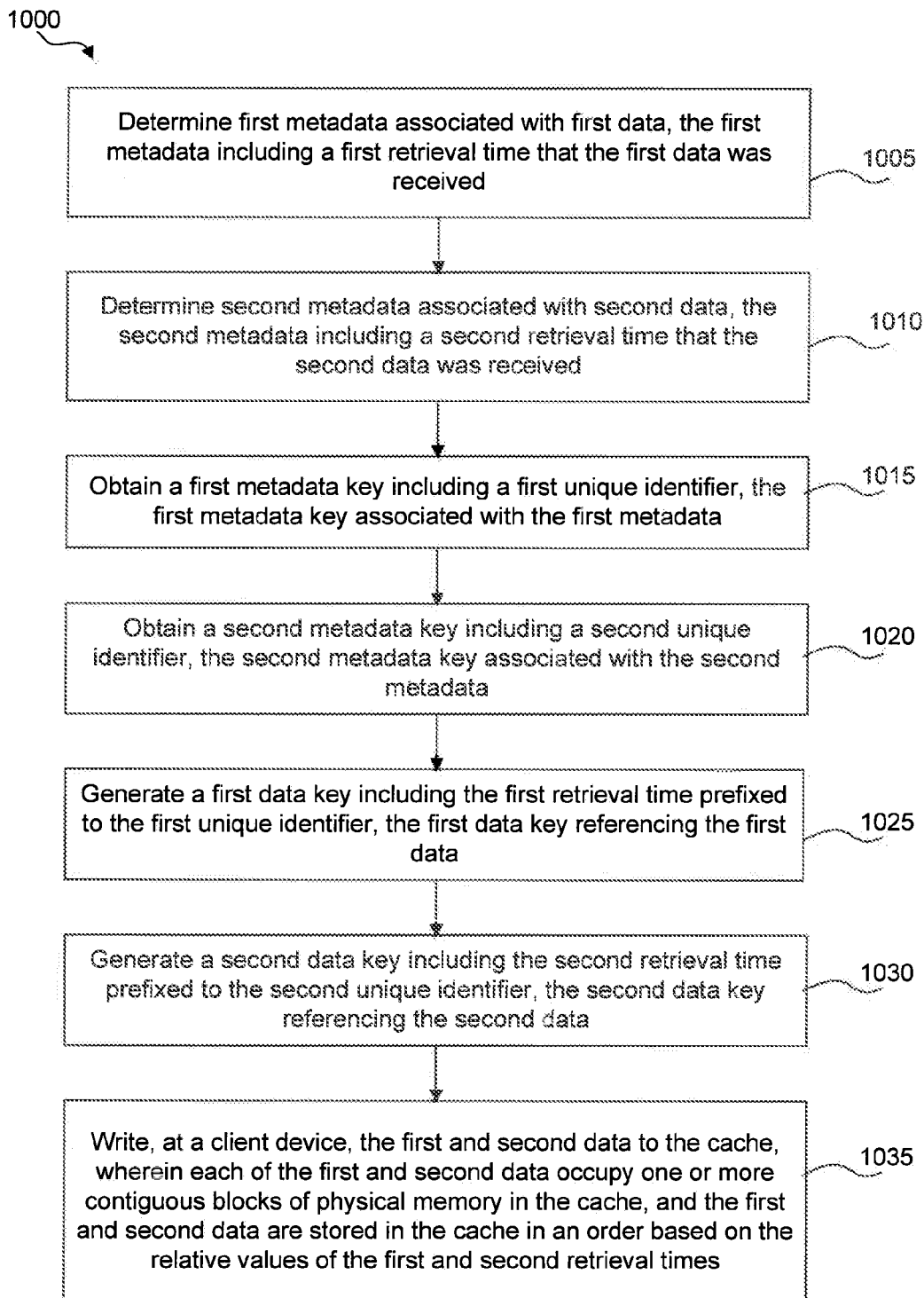
FIG. 10 is a flowchart of another example method for passive compaction of a cache, according to an embodiment.

FIGS. 9 and 10 are flowcharts of an example method for passive compaction of a cache, according to an embodiment. Although method 900 is described with respect to client device 104 and method 1000 is described with respect to client device 204, methods 900 and 1000 are not meant to be limited to these client devices.

In FIG. 9, at a stage 905, a plurality of data units is retrieved via a network interface. In an embodiment, client device 104 includes a memory, a network interface, and processing circuitry (not shown). In an example, the processing circuitry retrieves a plurality of data units via the network interface.

At a stage 910, a retrieval time associated with each of the plurality of data units is determined. In an example, the processing circuitry determines a retrieval time associated with each of the plurality of data units.

At a stage 915, a cache in the memory is maintained such that data units with a retrieval time in a first time interval are grouped contiguously in a first logical portion of the cache, and data units with a retrieval time in a second time interval are grouped contiguously in a second logical portion of the cache. In an example, the processing circuitry maintains a cache in the memory such that data units with a retrieval time in a first time interval are grouped contiguously in a first logical portion of the cache and data units with a retrieval time in a second time interval are grouped contiguously in a second logical portion of the cache.

According to an embodiment, stages 905-915 may be performed by components of system 100.

In FIG. 10, at a stage 1005, first metadata associated with first data are determined, and the first metadata includes a first retrieval time that the first data was received. In an example, metadata engine 224 determines first metadata associated with the first data, and the first metadata includes a first retrieval time that the first data was received.

At a stage 1010, second metadata associated with second data are determined, and the second metadata includes a second retrieval time that the second data was received. In an example, metadata engine 224 determines second metadata associated with the second data, and the second metadata includes a second retrieval time that the second data was received.

At a stage 1015, a first metadata key including a first unique identifier is obtained, and the first metadata key is associated with the first metadata. In an example, metadata engine 224 obtains a first metadata key including a first unique identifier, and the first metadata key is associated with the first metadata.

At a stage 1020, a second metadata key including a second unique identifier is obtained, and the second metadata key is associated with the second metadata. In an example, metadata engine 224 obtains a second metadata key including a second unique identifier, and the second metadata key is associated with the second metadata.

At a stage 1025, a first data key including the first retrieval time prefixed to the first unique identifier is generated, and the first data key references the first data. In an example, data key engine 228 generates a first data key including the first retrieval time prefixed to the first unique identifier, and the first data key references the first data.

At a stage 1030, a second data key including the second retrieval time prefixed to the second unique identifier is generated, and the second data key references the second data. In an example, data key engine 228 generates a second data key including the second retrieval time prefixed to the second unique identifier, and the second data key references the second data.

At a stage 1035, the first and second data are written to the cache at a client device. Each of the first and second data occupy one or more contiguous blocks of physical memory in the cache, and the first and second data are stored in the cache in an order based on the relative values of the first and second retrieval times. In an example, cache writing engine 232 writes, at a client device, the first and second data to the cache. Each of the first and second data occupy one or more contiguous blocks of physical memory in the cache, and the first and second data are stored in the cache in an order based on the relative values of the first and second retrieval times.

According to an embodiment, stages 1005-1035 may be performed by components of system 200.

VI. Example Computer Embodiment

In an embodiment, the systems, methods, and components of embodiments described herein are implemented using computers. For example, cache manager 120, cache manager 220, or cache node manager 840 may be implemented using system 1100.

Figure 11:
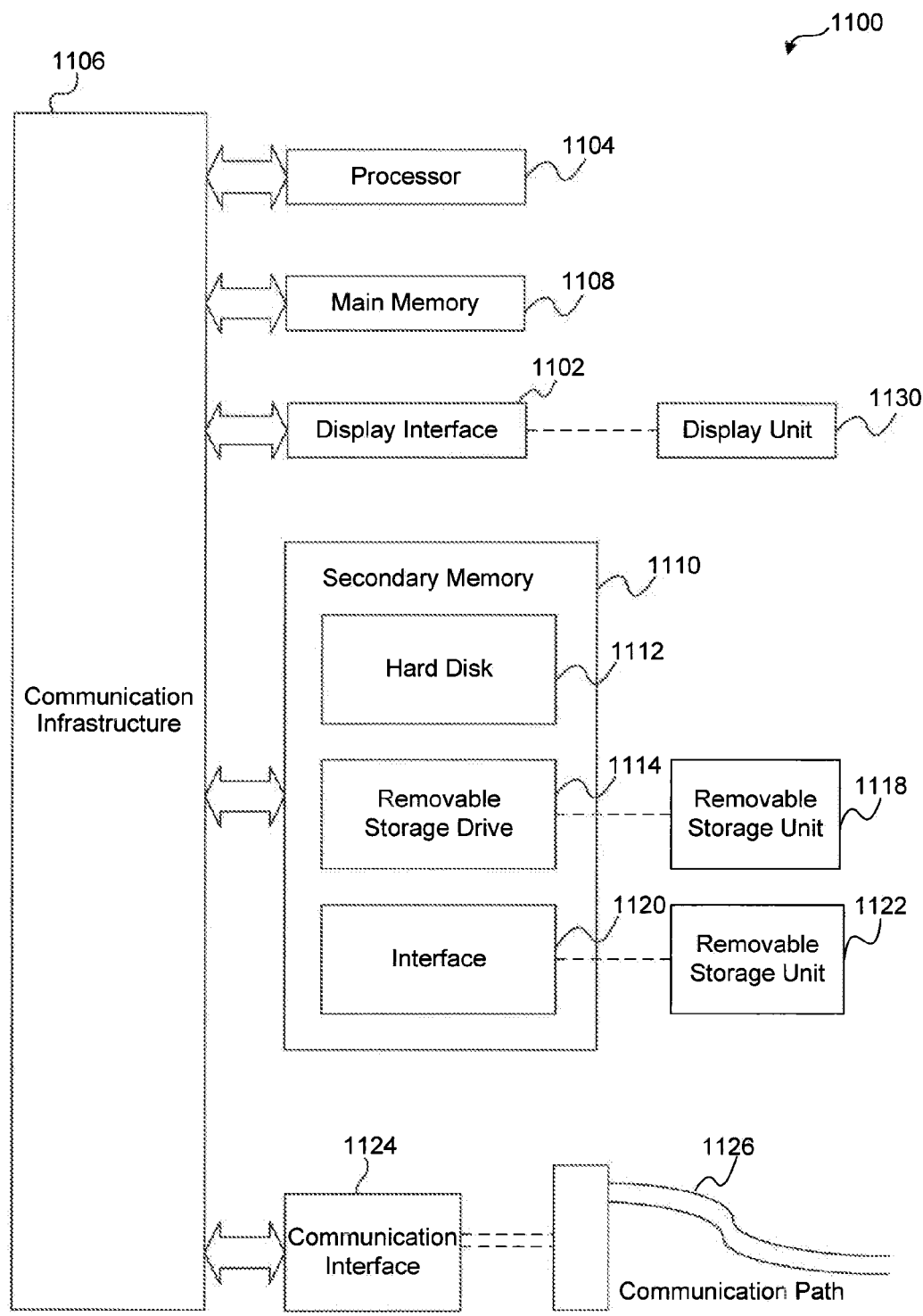
FIG. 11 is a diagram illustrating an example computer system in which embodiments may be implemented as computer-readable code.

FIG. 11 is a diagram illustrating an example computer system 1100 in which embodiments may be implemented as computer-readable code. Hardware, software, or any combination of such may embody any of the modules and components in FIG. 11.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 1100. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 1104 may be a single processor in a multi-core/multiprocessor system, such system operating alone, or in a cluster of computing devices operating in a cluster or server farm. Processor device 1104 is connected to a communication infrastructure 1106, for example, a bus, message queue, network, or multi-core message-passing scheme. Computer system 1100 may also include display interface 1102 and display unit 1130. Display interface 1102 allows results of the computer operations to be displayed to a user or an application developer via display unit 1130.

Computer system 1100 also includes a main memory 1108, for example, random access memory (RAM), and may also include a secondary memory 1110. Secondary memory 1110 may include, for example, a hard disk drive 1112 and a removable storage drive 1114. Removable storage drive 1114 may include a floppy disk drive, a magnetic tape drive, an optical disk drive, a flash memory, or the like. The removable storage drive 1114 reads from and/or writes to a removable storage unit 1118 in a well-known manner. Removable storage unit 1118 may include a floppy disk, magnetic tape, optical disk, etc. which is read by and written to by removable storage drive 1114. As will be appreciated by persons skilled in the relevant art, removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 may be in the form of non-storage-capable signals, which may be electronic, electromagnetic, optical, or other signals capable of being received by communications interface 1124. These signals may be provided to communications interface 1124 via a communications path 1126. Communications path 1126 carries signals and may be implemented using wire or cable, fiber optics, a phone line, a cellular phone link, an RF link or other communications channels.

In this document, the terms "computer program storage medium" and "computer readable storage medium" are used to generally refer to media such as removable storage unit 1118, removable storage unit 1122, and a hard disk installed in hard disk drive 1112. Computer program storage medium and computer readable storage medium may also refer to memories, such as main memory 1108 and secondary memory 1110, which may be memory semiconductors (e.g. DRAMs, etc.).

Computer programs (also called computer control logic) are stored in main memory 1108 and/or secondary memory 1110. Computer programs may also be received in non-storage-capable signals via communications interface 1124. Such computer programs, when executed, enable computer system 1100 to implement embodiments as discussed herein. In particular, the computer programs, when executed, enable processor device 1104 to implement the processes, such as the stages in the methods illustrated by flowchart 900 of FIG. 9 or flowchart 1000 of FIG. 10 discussed above. Accordingly, such computer programs represent controllers of the computer system 1100. Where embodiments are implemented using software, the software may be stored in a computer program product and loaded into computer system 1100 using removable storage drive 1114, interface 1120, and hard disk drive 1112, or communications interface 1124.

Embodiments also may be directed to computer program products including software stored on any computer readable storage medium. Such software, when executed in one or more data processing device, causes a data processing device (s) to operate as described herein. Embodiments employ any computer useable or readable medium. Examples of computer readable storage mediums include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS, nanotechnological storage device, etc.).

The Summary and Abstract sections may set forth one or more but not all example embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described example embodiments, but should be defined only in accordance with the following claims and their equivalents.

What is claimed is:

1. A method for passive compaction of a cache, comprising:
   determining, by one or more computing devices, first metadata associated with first data, the first metadata including a first retrieval time that the first data was received;
   determining, by the one ore more computing devices, second metadata associated with second data, the second metadata including a second retrieval time that the second data was received;
   obtaining, by the one or more computing devices, a first metadata key including a first unique identifier, the first metadata key associated with the first metadata;
   obtaining, by the one or more computing devices, a second metadata key including a second unique identifier, the second metadata key associated with the second metadata;
   generating, by the one or more computing devices, a first data key including the first retrieval time prefixed to the first unique identifier, the first data key referencing the first data;
   generating, by the one or more computing devices, a second data key including the second retrieval time prefixed to the second unique identifier, the second data key referencing the second data; and writing, by the one or more computing devices, the first and second data to the cache, wherein each of the first and second data occupy one or more contiguous blocks of physical memory in the cache, and the first and second data are stored in the cache in an order based on the relative values of the first and second retrieval times.

2. The method of claim 1, wherein the first and second data are representations of geographic areas.

3. The method of claim 1, wherein the first unique identifier represents a location where the first data is stored at a first server and the second unique identifier represents a location where the second data is stored at a second server.

4. The method of claim 1, further comprising:
receiving a request for cached data to be rendered, the request including a given unique identifier;
identifying metadata associated with the given unique identifier,
identifying a retrieval time included in the identified metadata;
determining a data key including the identified retrieval time prefixed to the given unique identifier, the data key referencing the cached data to be rendered;
reading, from the cache, the cached data to be rendered based on the data key;
determining a time that the cached data was read; and
updating an access time included in the identified metadata with the determined time that the cached data was read.

5. The method of claim 4, further comprising implementing a least recently used cache algorithm on the cache, the implementing comprising:
determining whether a given metadata satisfies a condition based on a retrieval time or access time included in the given metadata;
identifying a data key that includes the same retrieval time included in the given metadata that satisfies the condition; and
deleting data referenced by the identified data key from the cache.

6. The method of claim 5, further comprising:
deleting the identified data key and the reference from the identified data key to the deleted data; and
deleting the metadata that satisfies the condition.

7. The method of claim 1, wherein the cache is stored on hard disk.

8. The method of claim 1, wherein the retrieval time is a monotonic counter or a global time.

9. The method of claim 1, wherein the retrieval times included in the data keys are stored in big-endian order.

10. A system for passively compacting a cache, comprising:
one or more processors;
a memory coupled to the one or more processors;
a metadata engine configured to:
determine first metadata associated with first data, wherein the first metadata includes a first retrieval time that the first data was received,
determine second metadata associated with second data, wherein the second metadata includes a second retrieval time that the second data was received,
obtain a first metadata key including a first unique identifier, wherein the first metadata key is associated with the first metadata, and
obtain a second metadata key including a second unique identifier, wherein the second metadata key is associated with the second metadata;
a key identifier configured to:
generate a first data key including the first retrieval time prefixed to the first unique identifier, wherein the first data key references the first data, and
generate a second data key including the second retrieval time prefixed to the second unique identifier, wherein the second data key references the second data; and
a cache writing engine configured to write, at a client device, the first and second data to the cache, wherein each of the first and second data occupy one or more contiguous blocks of physical memory in the cache, and the first and second data are stored in the cache in an order based on the relative values of the first and second retrieval times,
wherein each of the metadata engine, data key engine, and cache writing engine is implemented on the one or more processors.

11. The system of claim 10, wherein the first and second data are representations of geographic areas.

12. The system of claim 10, wherein the metadata engine is further configured to receive a request for cached data to be rendered and identify metadata associated with a given unique identifier included in the request,
the data key engine is further configured to identify a retrieval time included in the identified metadata and determine a data key including the identified retrieval time prefixed to the given unique identifier, wherein the data key references the cached data to be rendered, and
the cache writing engine is further configured to read, from the cache, the cached data to be rendered based on the data key, determine a time that the cached data was read from the cache, and update an access time included in the identified metadata with the determined time that the cached data was read.

13. The system of claim 12, wherein the data key engine is further configured to determine whether a given metadata satisfies a condition based on a retrieval time or access time included in the given metadata and to identify a data key that includes the same retrieval time included in the given metadata that satisfies the condition, and the cache writing engine is further configured to mark the data referenced by the identified data key in the cache as deleted.

14. The system of claim 10, wherein the cache manager is further configured to implement a least recently used cache algorithm based on retrieval times or access times included in given metadata.

15. The system of claim 10, wherein the cache is stored on hard disk.

16. The system of claim 10, wherein the retrieval time is a monotonic counter or a global time.

17. The system of claim 10, wherein the retrieval times included in the data keys are stored in big-endian order.

18. A non-transitory computer readable storage medium encoded with a computer program, the program comprising instructions that when executed by one or more processors cause the one or more processors to perform operations comprising:
determining first metadata associated with first data received, the first metadata including a first retrieval time that the first data was received;
determining second metadata associated with second data received, the second metadata including a second retrieval time that the second data was received;
obtaining a first metadata key including a first unique identifier, the first metadata key associated with the first metadata;

obtaining a second metadata key including a second unique identifier, the second metadata key associated with the second metadata;

generating a first data key including the first retrieval time prefixed to the first unique identifier, the first data key referencing the first data;

generating a second data key including the second retrieval time prefixed to the second unique identifier, the second data key referencing the second data; and writing, at a client device, the first and second data to the cache, wherein each of the first and second data occupy one or more contiguous blocks of physical memory in the cache, and the first and second data are stored in the cache in an order based on the relative values of the first and second retrieval times.

19. The computer readable storage medium of claim 18, the operations further comprising:

receiving a request for cached data to be rendered, the request including a given unique identifier;

identifying metadata associated with the given unique identifier;

identifying a retrieval time included in the identified metadata;

determining a data key including the identified retrieval time prefixed to the given unique identifier, the data key referencing the cached data to be rendered;

reading, from the cache, the cached data to be rendered based on the data key;

determining a time that the cached data was read from the cache; and updating an access time included in the identified metadata with the determined time that the cached data was read from the cache.

20. The computer readable storage medium of claim 19, the operations further comprising:

determining whether a given metadata satisfies a condition based on a retrieval time or access time included in the given metadata;

identifying a data key that includes the same retrieval time included in the given metadata that satisfies the condition; and deleting data referenced by the identified data key from the cache.

21. The computer readable storage medium of claim 18, wherein the retrieval times included in the data keys are stored in big-endian order.

* * * * *